United States Patent
Swars

(10) Patent No.: US 6,192,582 B1
(45) Date of Patent: Feb. 27, 2001

(54) ASSEMBLED MULTI-LAYER SHAFTS

(75) Inventor: Helmut Swars, Bergisch-Gladbach (DE)

(73) Assignee: Emitec Gesellschaft für Emissionstechnologie mbH, Lohmar (DE)

(*) Notice: Subject to any disclaimer, the term of this patent is extended or adjusted under 35 U.S.C. 154(b) by 0 days.

(21) Appl. No.: 09/410,721

(22) Filed: Oct. 1, 1999

Related U.S. Application Data

(62) Division of application No. 08/916,085, filed on Aug. 21, 1997, now Pat. No. 5,979,386.

(30) Foreign Application Priority Data

Feb. 27, 1995 (DE) .................................. 195 06 732
Feb. 23, 1996 (DE) .................................. 296 06 732 U

(51) Int. Cl.[7] .................................................... B23P 15/00
(52) U.S. Cl. .......................................................... 29/888.1
(58) Field of Search ........................... 29/421.1, 523, 29/888.1, 522.1; 74/567, 561

(56) References Cited

U.S. PATENT DOCUMENTS

| | | | |
|---|---|---|---|
| 4,644,912 | * | 2/1987 | Umeha et al. . |
| 4,750,250 | * | 6/1988 | Maus et al. . |
| 4,835,832 | * | 6/1989 | Arnold et al. ........................ 29/523 |
| 4,875,270 | * | 10/1989 | Krips et al. ........................ 29/421.1 |
| 5,038,450 | * | 8/1991 | Swars ................................. 29/421.1 |
| 5,052,845 | * | 10/1991 | Maus et al. . |
| 5,079,836 | * | 1/1992 | Swars . |
| 5,101,554 | * | 4/1992 | Breuer et al. ...................... 29/888.1 |
| 5,187,855 | * | 2/1993 | Swars et al. ......................... 29/523 |
| 5,207,120 | * | 5/1993 | Arnold et al. . |
| 5,259,268 | * | 11/1993 | Ebbinghaus et al. . |
| 5,979,386 | * | 11/1999 | Swars ................................. 123/90.6 |

FOREIGN PATENT DOCUMENTS

| | | | |
|---|---|---|---|
| 2 232 438 | 1/1974 | (DE) . | |
| 29 14 095 | 10/1980 | (DE) . | |
| 3525186A1 | 1/1987 | (DE) | ................ B23P/11/02 |
| 3800912C2 | 7/1989 | (DE) | ................ B21D/39/06 |
| 3837291A1 | 5/1990 | (DE) | ................ F16C/3/10 |
| 3842590C1 | 6/1990 | (DE) | ................ F16C/3/02 |
| 3927896A1 | 2/1991 | (DE) | ................ B21D/39/06 |
| 3941718A1 | 6/1991 | (DE) | ................ B21D/53/84 |
| 43 06 621 | 9/1994 | (DE) . | |
| 292 795 | 11/1988 | (EP) . | |
| 324 498 | 7/1989 | (EP) . | |
| 2 121 908 | 1/1984 | (GB) . | |
| 2167524A | 5/1984 | (GB) . | |

* cited by examiner

Primary Examiner—I Cuda Rosenbaum
(74) Attorney, Agent, or Firm—Cohen, Pontani, Lieberman & Pavane

(57) ABSTRACT

A method of making a hollow shaft having multiple functional elements arranged along the axis of an inner shaft tube is provided. Several multiple shafts equipped with functional elements may be joined by expansion using probes inserted into the shafts and connected to a high pressure generator. In addition, a method of providing functional elements to an inner tube wherein the individual non-round functional elements have annular projections concentric to the base circle is provided, where the internal diameter of the functional elements is slightly larger than the external diameter of the shaft tube. The functional elements have an annular region on their lateral edges of approximately half the wall thickness that complements the adjacent non-round functional element to achieve a full wall thickness and the annular projections are produced by re-formation of the profile tube. The present invention permits manufacturer of, for example, multiple cams, while retaining torsional stiffness of the cam shaft and allowing for close placement of the functional elements with respect to one another.

2 Claims, 5 Drawing Sheets

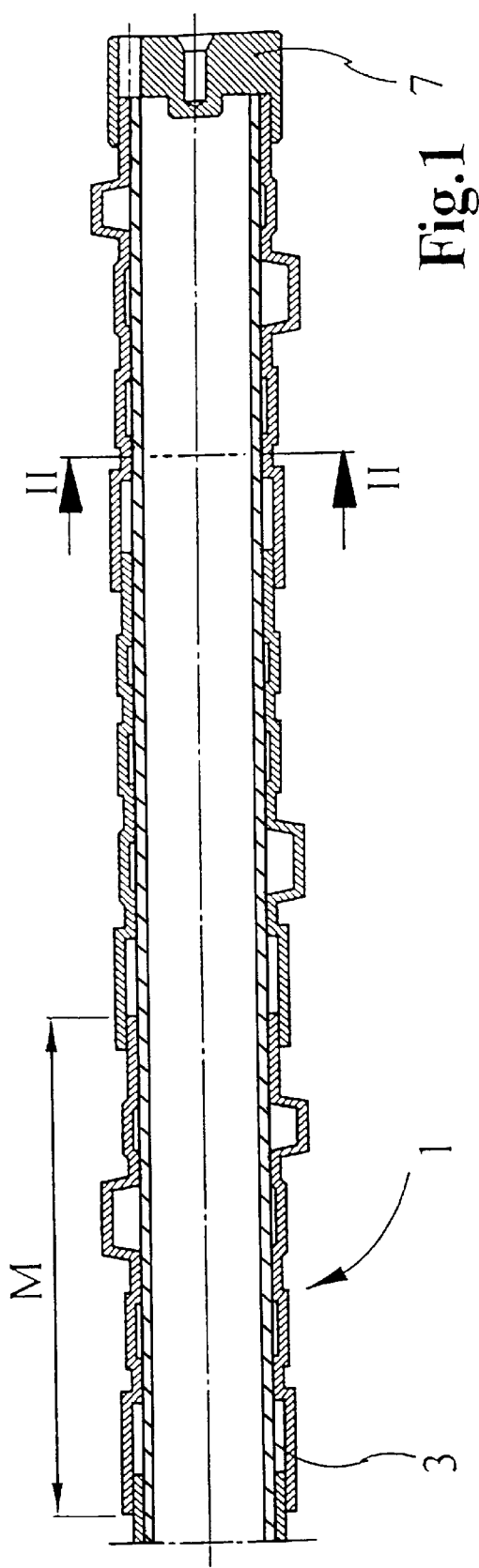
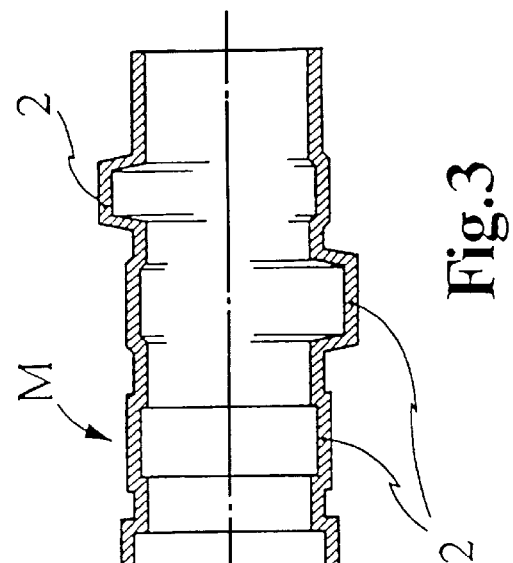
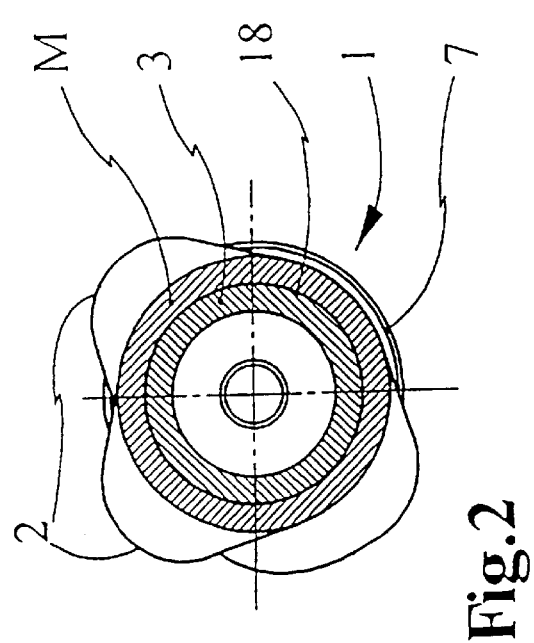

ASSEMBLED MULTI-LAYER SHAFTS

The present application is a divisional of patent application Ser. No. 08/916,085, filed on Aug. 21, 1997, now issued as U.S. Pat. No. 5,979,386.

BACKGROUND OF THE INVENTION

1. Field of the Invention

The invention relates to assembled hollow shafts, comprising an inner shaft tube with external functional elements, joined by means of radial expansion in given sections in the axial direction, whereby the inner shaft tube is deformed plastically in the expansion sections and the functional elements are only deformed resiliently in the expansion sections and the expansion sections lie between the functional elements, whereby the functional elements are combined in part into multiple functional elements. The invention also relates to processes for producing shafts of this type and for producing multiple functional elements to be used in manufacturing assembled hollow shafts.

2. Description of the Prior Art

Given the growing importance of multiple valve technology in the field of drive and control shafts (especially cam shafts) for internal combustion engines, the problem of constructing shafts that have many closely adjacent elements, such as cams and other functional parts as well as slide bearings and axial stops, arises ever more frequently. This problem poses increasing difficulties when conventional methods are used. Another problem, especially in large-diameter shafts, is that of weight, which increases quadratically.

Interesting approaches to this set of problems have been made, particularly in the field of assembled hollow cam shafts. Although the problem of cam spacing with decreasing weight can be overcome, other difficulties then arise with respect to decreasing torsional stiffness. Furthermore, the number of functional elements that must be applied to and positioned precisely on each shaft becomes very large. In the case of truck shafts, especially for diesel engines, this problem is accompanied by another difficulty, namely, the necessity of keeping the wall of the hollow shaft relatively thick, even in the single-layered areas between functional elements, for the sake of the required torsional stiffness. The advantage of reduced weight can therefore not be achieved to the desired extent.

Finally, lengthy preparation time is required prior to assembly, especially in the case of long shafts, due to the slow introduction of high-pressure probes into the hollow shaft, for example. This lengthy preparation time reduces the productivity of expensive capital resources.

A reduction in at least some of the aforementioned problems in the production of assembled hollow shafts can be attained by using multiple functional elements, e.g., multiple cams. For example, it has been proposed to produce multiple cams from tube profiles by means of twisting, or from sheet metal blanks, which are suitably shaped, formed into annular bodies and welded.

The first of these proposals, however, is limited to uniform cam profiles. Furthermore, the cams do not possess great stiffness against external pressure, e.g., follower pressure. Moreover, both proposals have very sharp limitations with respect to the spreading or the varied angular pitch of cam tips around the circumference. This limitation can be overcome in the second proposal only by using an expensive process variant.

Generic hollow shafts are known from EP-A-292 795. Double cam elements are described therein, in which an expansion section is arranged between the two external cam sections. The reason for this structure is that the cam sections of the one-piece double cam are subsequently hardened and, due to embrittlement, are not resiliently deformable to the desired extent, so that only the non-hardened middle sections are expanded. These double cams have the disadvantage, however, that the cam sections must be clearly spaced from one another, as a result of which the design of shafts with many closely adjacent functional elements is made more difficult or prevented. Moreover, the combination is limited to two elements with the same function or load.

SUMMARY OF THE INVENTION

The invention is based on the technical problem of proposing novel designs for assembled hollow shafts with external functional elements that avoid the aforementioned problems and are advantageous and inexpensive to produce. A further object is to produce processes to produce such shafts and to produce multiple functional elements in highly productive, highly accurate and inexpensive manner.

The invention solves this problem by embodying generic assembled hollow shafts in such a way that the multiple functional elements comprise a plurality of individual parts, which are combined in the axial direction, whereby non-round individual parts have, in the axial direction, annular projections concentric to the basic circle, the internal diameter of which is slightly larger than the external diameter of the inner shaft tube, whereby the projections have, on their sides that are adjacent to non-round elements, an annular piece of approximately half wall thickness that complements the adjacent non-round individual part in such a way as to achieve full wall thickness, and round individual parts have an internal diameter that fits exactly onto the external diameter of the annular projections. The invention also provides a process to produce assembled hollow shafts, whereby the sectional expansion is carried out by means of hydraulic internal high pressure and the hydraulic fluid is introduced into the hollow shaft by a probe, whereby the external diameter of the probe is only slightly smaller than the internal diameter of the shaft and the probe is sealed against the hollow shaft at the two axial ends of the expansion sections by sealing elements, characterized by the fact that the probes, which have a detachable high-pressure rapid connection, are inserted into and placed in the shaft before the connection to the high-pressure generator and that several finally-combined multiple shafts equipped with probes are connected simultaneously to the high-pressure generator and joined by means of expansion. The invention also provides a process to produce multiple functional elements, especially multiple cams, for use in the production of assembled hollow shafts with external functional elements, especially cam shafts, in which the individual functional elements are produced from tubes with a profile (i.e., profile tubes) corresponding to the functional elements and are combined into multiple cams, whereby the non-round functional elements, in the axial direction, have annular projections concentric to the base circle, the internal diameter of which is slightly larger than the external diameter of the shaft tube, and which have on their lateral edges an annular region of approximately half wall thickness that complements the adjacent non-round functional element 2 in such a way as to achieve full wall thickness, and whereby the annular projects are produced by re-formation of the profile tube.

An entire series of advantages can be attained by using the multiple cams according to the invention. The examples shown in FIG. 13, below, in which the inlet cam, the outlet cam, the diesel-injection cam and a slide bearing are combined into a module, allow the number of individual parts needed for a six-cylinder diesel engine to be reduced from 26 to 9, for example, compared with the individual functional parts assembled according to the prior art. The examples shown have been selected with any eye to the usual functions of modern truck engines. The technology according to the invention permits the optimal implementation of designs that have a plurality of cams per cylinder; for example, for the purpose of using injection features or valve-shutoff and closing angle spreading.

This comparison, which contrasts cam shafts manufactured by conventional assembly methods with cam shafts of the same size and function manufactured according to the invention, illustrates the differences among various embodiments with respect to weight and torsional stiffness (expressed as the polar inertial moment $J_P$ in the dimension $cm^4$). The advantages of the shafts according to the invention result largely from the fact that while the weight increases only linearly with the tube diameter, the torsional stiffness increases with the tube diameter by a power of four and, in addition, benefits from the multi-layered structure at assembly points.

The invention is described in greater detail in reference to the attached drawings, which depict various embodiments.

BRIEF DESCRIPTION OF THE DRAWINGS

FIG. 1 is a longitudinal section of a portion of a shaft according to the invention;

FIG. 2 is a section along Line II—II in FIG. 1;

FIG. 3 is a multiple cam module manufactured by precision casting using the lost wax process;

DETAILED DESCRIPTION OF THE PREFERRED EMBODIMENTS

Figure 4:
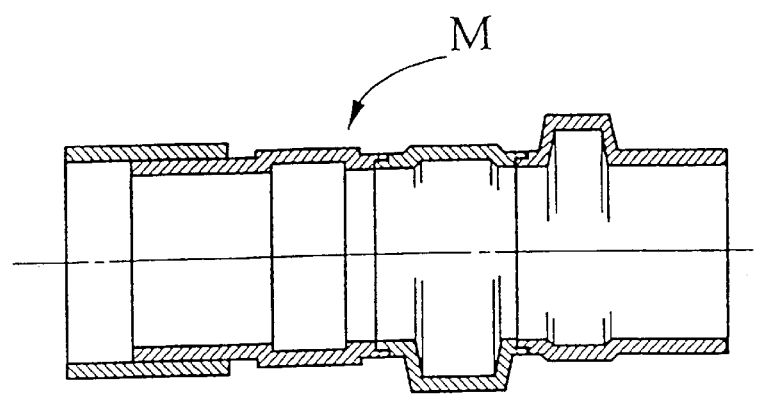
FIG. 4 is a multiple cam module composed of individual parts.

FIG. 1 shows part of a cam shaft 1 for a diesel truck engine, in which the functional elements, i.e., the slide bearing 6, the outlet cam, the injection cam and the inlet cam 2, are combined into a module M, which is produced as a multiple cam and incorporated in its entirety into the shaft tube 3. FIG. 1 also shows a shaft closing cap 7 or an end piece at the right end of the shaft. In the example depicted, the inlet cam 2 is higher and narrower than the outlet cam, while the injection cam is typically shaped, i.e., it has an elongated flat flank and a short steep flank, as FIG. 2 illustrates. FIG. 2 shows the axial slots 18 provided on the shaft 3 at a 60° pitch, for example, into which are fitted correspondingly shaped pieces or tips on the inner surface of the multiple cam. This permits highly accurate orientation of the multiple cam that is to be positioned on the shaft tube 3. Inside the multiple cam module M, the cam divisions can be accurately preestablished and oriented relative to one another. As a result, the assembled shaft 1 can be preassembled quickly and accurately.

FIG. 3 shows a multiple cam module M, which is produced in one piece from bearing steel by means of the lost wax method, for example. This method allows high accuracy to be attained, for example, <$\frac{1}{10}$. FIG. 3 also shows that the assembly surfaces, which are those internal surface sections that have the smallest diameters, can be of generous size for the entire module. As a result, the surface portions associated with the functional elements need not be used as assembly points, which means that the functional elements can be designed as "hollow" beyond the smallest internal diameter. The total available assembly area nonetheless provides a highly adequate friction moment, so that a reliable friction connection is ensured during the selected assembly process.

Figure 5:
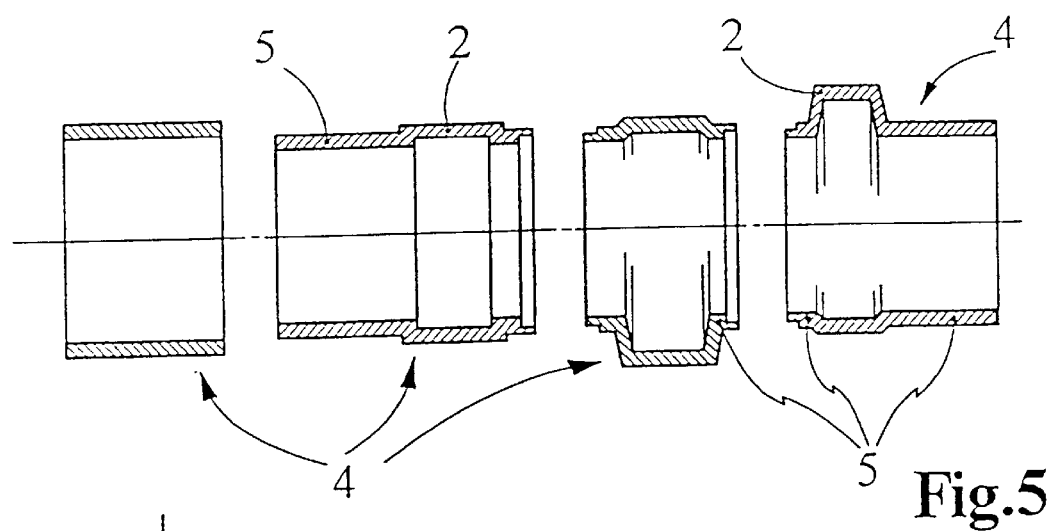
FIG. 5 shows a multiple cam module as in FIG. 4, broken down into its individual parts.

FIG. 4 shows a multiple cam module that has the same dimensions as the module in FIG. 3, but is composed of individual parts 4. FIG. 5 shows the individual parts 4 of this module M in disassembled form. It can clearly be seen that the annular projections 5, which extend axially as continuations of the actual functional elements, always have, when adjacent to another, non-round functional part, a shoulder-shaped annular piece of roughly half wall thickness at their outer end. The shaped pieces or shoulders and the adjacent "unround" functional parts complement each other to achieve a full wall thickness and constitute a common component of the assembly sections. As a result, in these overlapping regions, as well as in the region where the bearing ring section 6 overlaps the non-shouldered projection of adjacent functional elements, the assembled shaft has material constellations of three layers-or even more than three layers, when more than one shaft tube layer is used-which significantly increases the torsional stiffness of the shaft.

Figures 6, 7:
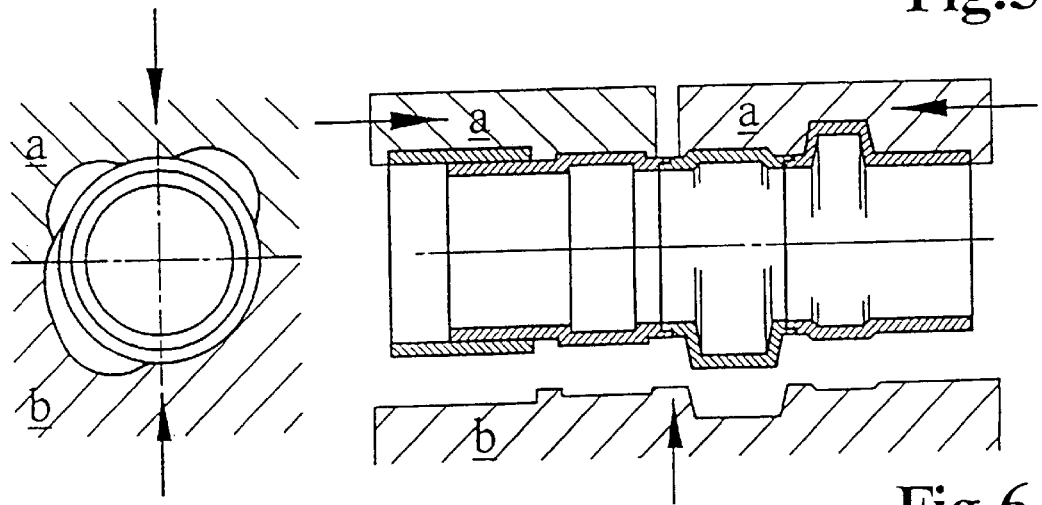
FIG. 6 shows a multiple cam module as in FIG. 4, with a schematic depiction of the device for consolidating the module.
FIG. 7 is a sectional view through the device with module as in FIG. 6.

FIGS. 6 and 7 show how the individual parts 4 in FIG. 5 are combined to form the multiple cam module M in FIG. 4 and, in schematic fashion, how a suitable assembly device a, b is constructed. The pre-oriented individual parts 4 are placed into a one-part lower die b. Onto this is lowered the two-part upper die a, which serves to accurately orient the functional profile. The two parts of the divided upper die a then move together and force the individual parts 4 into each other until they achieve axial alignment reciprocally or at stops in the lower die b. The connections of the individual parts 4 can be so accurately preestablished that a pressure seat forms, which in itself makes the module operationally reliable. Alternatively, however, devices to connect the individual parts 4 to each other can be provided, for example, a point welding device.

Figure 8A:
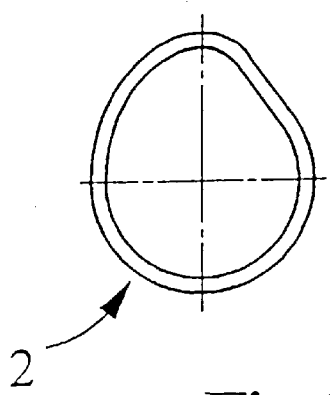
FIGS. 8a & b show examples of profile tubes for producing individual cams.
Figure 8B:
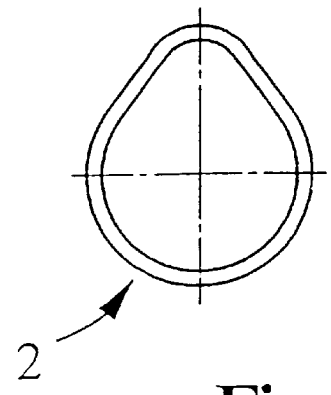
Figure 9:
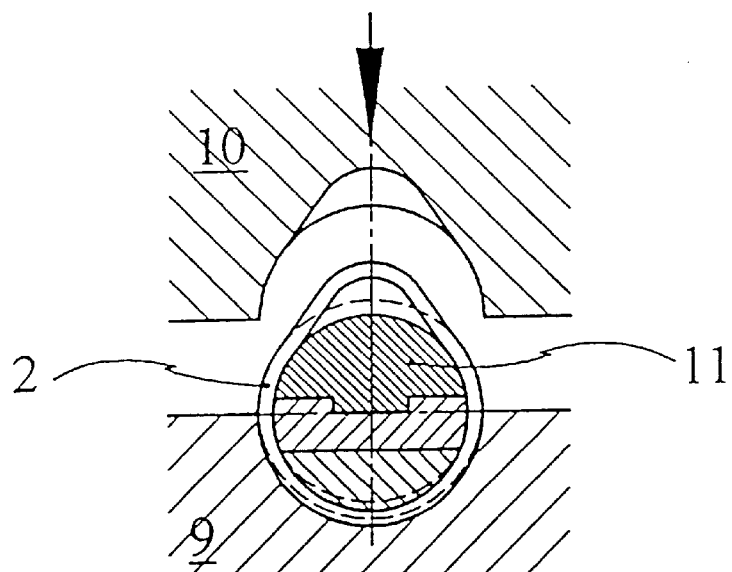
FIG. 9 is a schematic sectional view of a tool (die) for re-forming the annular projections from a profile tube along the line IX—IX of FIG. 10.
Figure 10:
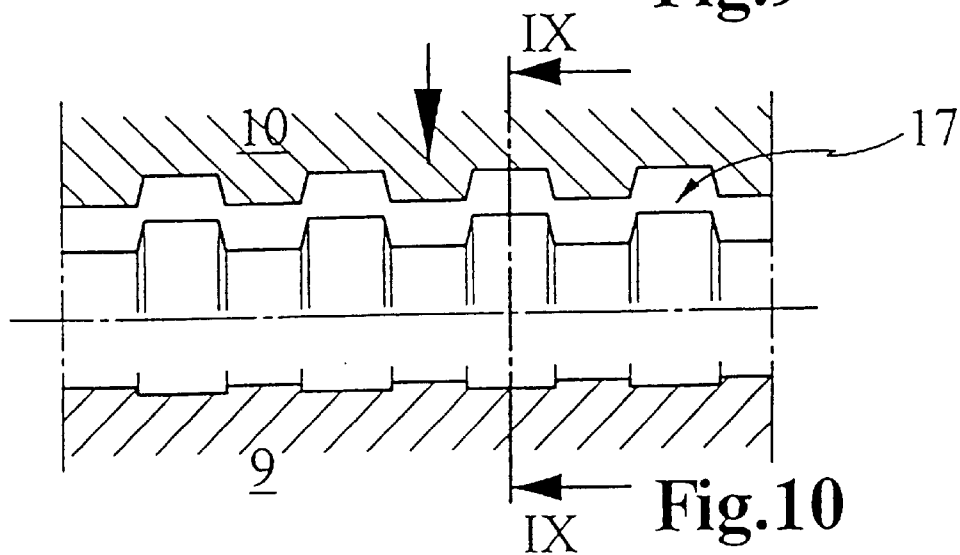
FIG. 10 is a schematic side view of the arrangement as in FIG. 9 from a viewing angle shifted by 90°.

FIGS. 8a and 8b show examples of profile tubes from which individual cams are produced. These profiles can correspond quite exactly to the functional element profiles or can have material to be worked at required points. In schematic fashion, FIGS. 9 and 10 show how individual contours with the annular projections 5 located between functional elements are reformed from such tubular rods. In the example shown, there is a press 9, 10 with which the annular projections 5 are re-formed by pressing against an internal die 11 arranged inside the profile tube. The illustrated example shows, in the unbroken or dashed lines, an embodiment in which the cam base circle is aligned with the lower part of the annular projection 5. In this case, the internal die 11 must have at least two parts, as indicated by the hatching, so that the lower part of the internal die 11 can be withdrawn after re-formation is complete. To facilitate assembly and disassembly, lead-in slopes can advantageously be provided. The upper part of the internal die then drops downward and can be withdrawn from the tube. If the cam base circle overhangs the annual projection 5 radially, the internal die 11 must have three parts, as indicated by the dashed-dotted line, so that first the middle part of the internal die, then the upper part, and finally the lower part can be withdrawn from the tube.

Figure 11:
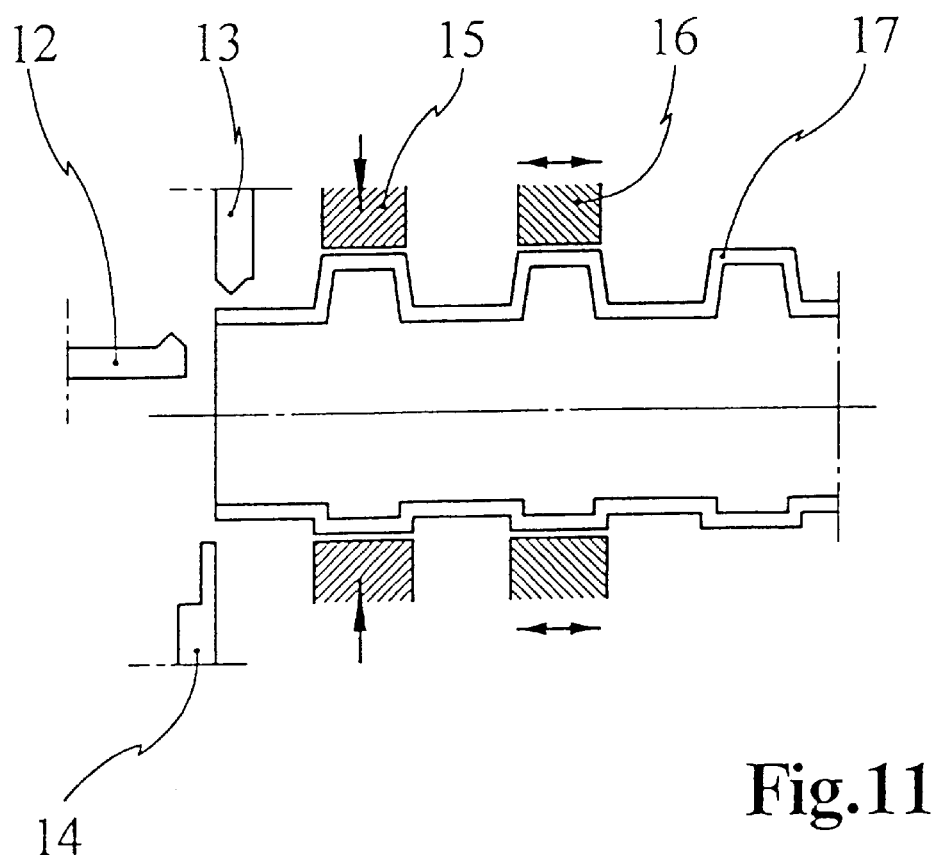
FIG. 11 is a schematic depiction of the functions of a multiple processing machine for mechanically processing tubular rods to produce individual cams.
Figure 12:
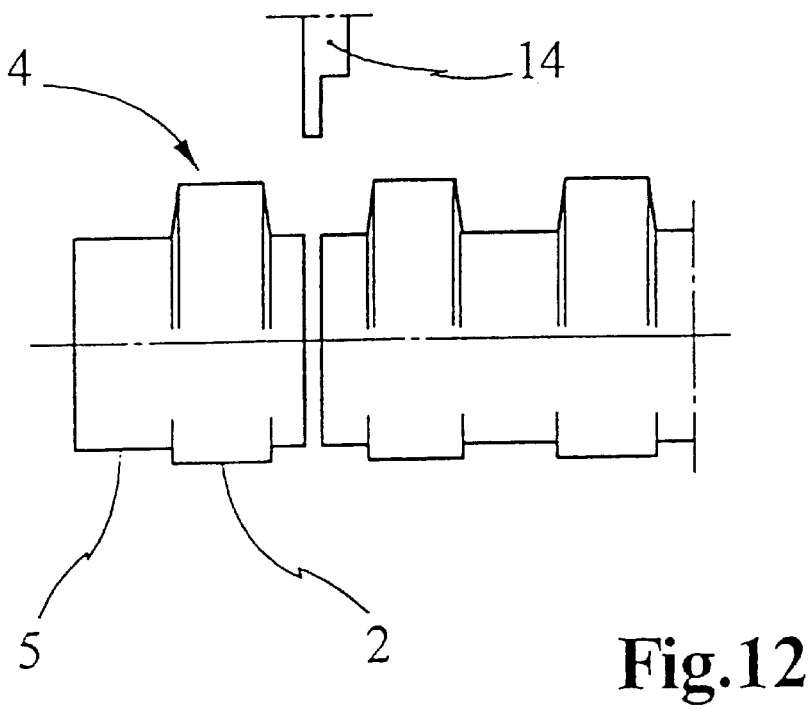
FIG. 12 is a detailed depiction of the separation of individual cams from the tubular rods.
Figure 13:
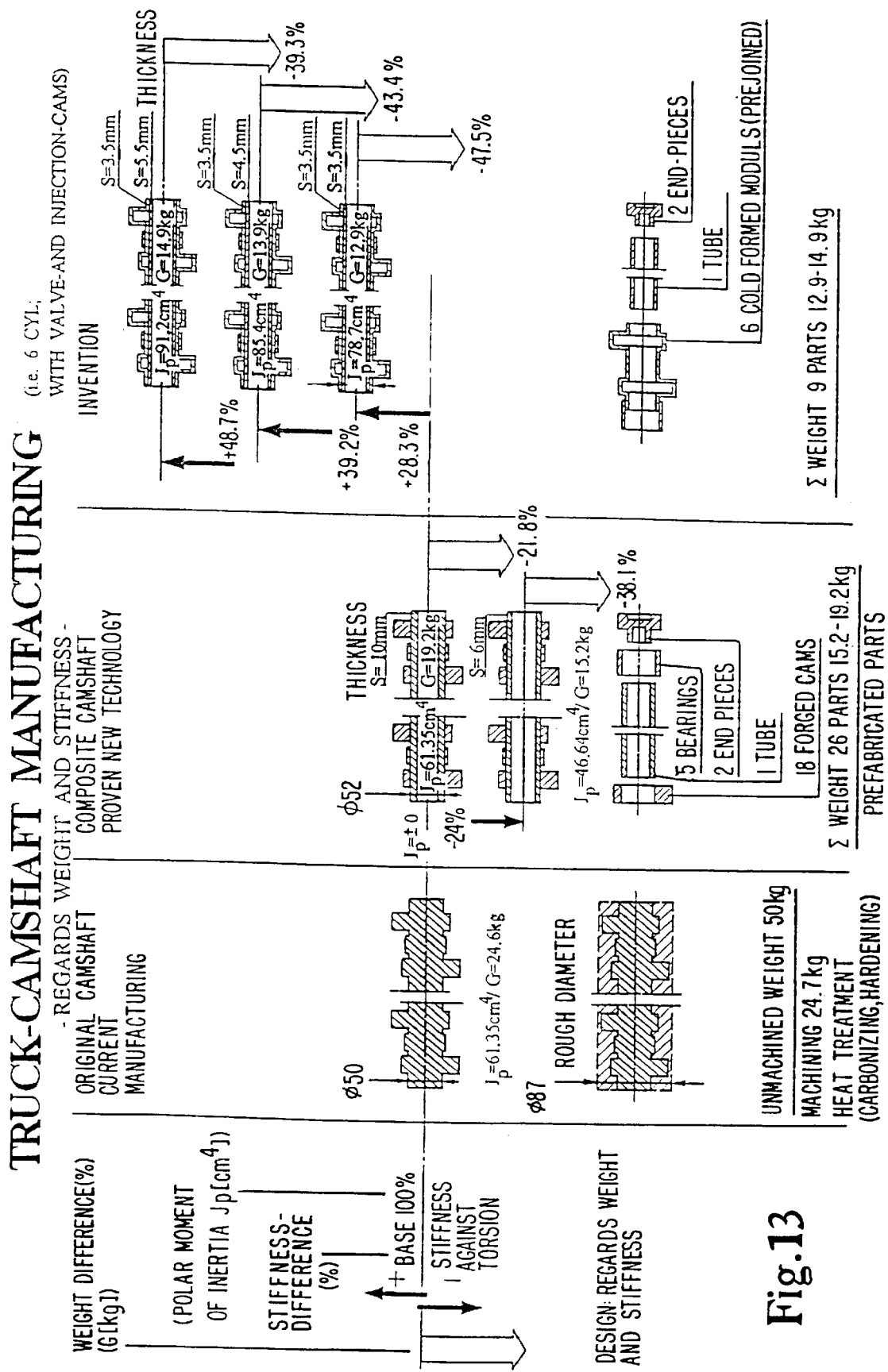
FIG. 13 is a diagram comparing the camshaft of the present invention to prior art camshafts.

In schematic fashion, FIG. 11 shows how the individual functional parts 4 can be separated from the shaped tubular rods 17 after suitable final working. Such an automatic rod machine contains dies or devices, for example, for five work steps. First, an internal turning tool 12 and an external turning tool 13 precisely manufacture the internal and external contours, as illustrated best by FIG. 5. The machine has two-part clamping chucks 15, 16, which are axially movable independent of each other and are used for clamping 15 and transporting 16 in the axial direction. After the internal and external working has been completed the individual parts are separated by a lancing tool 14. FIG. 12 gives a detailed view of the separating tool (here, a lancing tool) and the cutting width for separation.

FIGS. 3, 4, 5, 6 and 12 show that the lateral areas of the cams are slightly conical, which advantageously facilitates the production of multiple cams. As shown in FIGS. 9 and 10, the re-formation of tubular rods can be carried out in presses, in which a number of tubular rods several meters in length are placed next to one another in suitable molds, allowing a large number of cams to be produced simultaneously by means of a single press stroke. Cold-drawn profile tubes of cylinder tube quality, in which tolerances of significantly less than $1/10$ mm can be maintained, are an especially suitable material for the tubular rods.

Until now, the drawings have described and illustrated examples of individual cams 4 produced by re-forming suitably shaped tubular rods. In the example, the re-forming is done by pressing. However, re-forming can also be carried out using other deformation processes, such as hammering, forging or rolling. It is also possible to produce the individual functional profiles by means of the internal deformation of a round tube.

The module division selected in the depicted example uses the combination of functional elements for one cylinder as the division standard. However, it is equally conceivable for the module to be composed of complementary part-function areas of two adjacent cylinders, if this seems useful given the distribution of functional profiles around the circumference.

Individual functional elements can be produced from the materials suitable in each particular case. Since it is not always possible to attain all properties in one material without further treatment, it is advantageous to optimize the task division for production, working and setting the run or load profile. For example, if a ball bearing steel such as 100 Cr6 is selected, this steel will be suitable for high hertzran pressing, but more difficult to work. If steels that are easier to work are selected, it is useful to do so on the basis of their suitability for surface hardening. It is also conceivable to select easily deformable utility steels, which are carburized after forming. Obviously, very different materials will be selected for individual functional elements, in keeping with their respective load profiles. It is important to ensure that a heat-treated microstructure for expansion exists in the assembly regions, i.e., essentially, in the annular projections 5, along with the functional elements.

The profile shown in FIG. 8a is typical for a diesel injection cam, while that shown in FIG. 8b is typical for inlet or outlet cams. When producing assembled cam shafts, it is beneficial, with respect to the linearity of the finished shaft, to clamp the shafts at the bearing points during expansion in prisms, such as those commercially available.

What is claimed is:

1. A process for producing multiple functional elements, for use in producing assembled hollow shafts with external functional elements, comprising the steps of:

producing the individual functional elements from tubes with a profile corresponding to the functional elements;

combining the functional elements into multiple cams on an inner shaft tube, whereby non-round functional elements have, in an axial direction, annular projections concentric relative to a base circle, the annular projections having an internal diameter that is slightly larger than an external diameter of the shaft tube, the non-round elements having lateral edges with an annular region of approximately half wall thickness that complements a wall thickness of an adjacent non-round functional element so as to achieve a full wall thickness of the shaft; and producing the annular projections by reforming the profile tubes.

2. A process for producing assembled hollow shafts, comprising the steps of:

providing a plurality of inner shaft tubes;

mounting external functional elements to the inner shaft tubes by radially expanding axial sections of the inner shaft tubes that lay between the functional elements with hydraulic internal high pressure by introducing a hydraulic fluid into the inner shaft tubes with a probe having an external diameter slightly smaller than an internal diameter of the shaft tubes, and sealing the probe against the shaft tube at both axial ends of the expanding axial sections with sealing elements, the probe being inserted into the shaft tube before being connected to a high-pressure generator to form multiple assembled hollow tubes; and joining a plurality of assembled hollow tubes with respective probes therein by simultaneously connecting the probes to the high-pressure generator and expanding the inner shaft tubes.

* * * * *